United States Patent [19]

Sorace et al.

[11] Patent Number: 5,668,842
[45] Date of Patent: Sep. 16, 1997

[54] HIGH-SPEED DIGITAL-TO-RF-CONVERTER

[75] Inventors: Ronald E. Sorace, Redondo Beach; Victor S. Reinhardt, Rancho Palos Verdes; Steven A. Vaughn, Sun City, all of Calif.

[73] Assignee: Hughes Aircraft Company, Los Angeles, Calif.

[21] Appl. No.: 395,946

[22] Filed: Feb. 28, 1995

[51] Int. Cl.$^6$ .................................................. H04K 1/02
[52] U.S. Cl. ............................ 375/308; 375/298; 375/302
[58] Field of Search ............................ 375/261, 260, 375/298, 308, 296, 302; 332/103, 144

[56] References Cited

U.S. PATENT DOCUMENTS

| | | | |
|---|---|---|---|
| 4,168,397 | 9/1979 | Bradley | 178/67 |
| 4,464,767 | 8/1984 | Bremer | 375/298 |
| 4,641,318 | 2/1987 | Addeo | 375/260 |
| 4,780,884 | 10/1988 | Karabinis | 375/261 |
| 5,175,514 | 12/1992 | Iinuma et al. | 375/308 |
| 5,311,553 | 5/1994 | Chennakeshu et al. | 375/308 |
| 5,371,481 | 12/1994 | Tittanen et al. | 375/261 |
| 5,463,355 | 10/1995 | Halloran | 375/261 |
| 5,495,504 | 2/1996 | Yasuda | 375/308 |
| 5,502,745 | 3/1996 | Williams et al. | 375/308 |
| 5,504,461 | 4/1996 | Vaughn | 375/308 |
| 5,504,465 | 4/1996 | Yung et al. | 375/308 |

*Primary Examiner*—Stephen Chin
*Assistant Examiner*—Joseph Roundtree
*Attorney, Agent, or Firm*—P. Y. Price; T. Gudmestad; W. K. Denson-Low

[57] ABSTRACT

A plurality of biphase modulators (42) each modulate a sinusoidal radio frequency signal based upon a corresponding one of a plurality of bits contained in a time-dependent data word. The biphase modulators (42) form a plurality of biphase modulated signals which are communicated to a summing network (40). The summing network (40) contains a plurality of attenuators (44) which attenuate the modulated signals to form a plurality of attenuated signals. The summing network (40) combines the attenuated signals to form a radio frequency signal.

8 Claims, 3 Drawing Sheets

HIGH-SPEED DIGITAL-TO-RF-CONVERTER

TECHNICAL FIELD

The present invention relates to methods and systems for converting a digital signal to a radio frequency signal.

BACKGROUND ART

The need to convert a digital signal to a radio frequency (RF) signal arises in a wide variety of military and commercial applications. In these applications, a digital-to-RF converter is employed to convert a digital signal representative of digital data to a radio frequency signal. The radio frequency signal provides a radio frequency representation of the digital data which can be transmitted in order to communicate the digital data.

FIG. 1 is a block diagram of a conventional vector digital-to-RF modulator 10. The digital-to-RF modulator 10 receives a baseband signal in the form of an inphase signal $S_I(t)$ representative of an inphase component of the baseband signal and a quadrature signal $S_Q(t)$ representative of a quadrature component of the baseband signal. The inphase signal $S_I(t)$ and the quadrature signal $S_Q(t)$ are applied to baseband processors 12 and 14, respectively. The baseband processors 12 and 14 perform steps such as bit mapping, symbol translation, and digital-to-analog conversion.

FIG. 2 is a block diagram illustrating the steps which may be performed by a baseband processor. The baseband processor receives a signal, such as the inphase signal or the quadrature signal, and applies the received signal to a shift register 16. The shift register 16 forms a multi-bit data word based upon the received signal. The data word is applied to a processor/translator 18 which performs steps of baseband processing and/or symbol translation. The output of the processor/translator 18 is applied to a digital-to-analog converter 20 which forms an analog signal representative of the data word.

Turning back to FIG. 1, the analog signal produced by the baseband processor 12 is modulated by a cosine wave signal, indicated by $\cos(\omega t)$, using a mixer 22. Similarly, the analog signal produced by the baseband processor 14 is modulated by a sine wave signal, indicated by $\sin(\omega t)$, using a mixer 24. The two modulated signals produced by the mixers 22 and 24 are combined by a summing block 26 to form the modulated radio frequency signal.

A disadvantage of the above-described methods and systems for digital-to-RF conversion is the limited rate of conversion which results from performing steps of baseband processing and digital-to-analog conversion. The rate limitation constrains the flexibility and versatility of present digital-to-RF converters.

SUMMARY OF THE INVENTION

It is an object of the present invention to provide a system for converting a digital signal to a radio frequency signal at an improved speed of conversion.

A further object of the present invention is to provide a highly versatile and flexible system for converting a digital signal to a radio frequency signal.

In carrying out the above objects, the present invention provides a system for converting a digital signal representative of a time-dependent data word to a radio frequency signal. The time-dependent data word includes a plurality of bits. The system comprises a plurality of biphase modulators each modulating a sinusoidal radio frequency signal based upon a corresponding bit. The biphase modulators form a plurality of biphase modulated signals. The system further comprises a summing network containing a plurality of attenuators. The attenuators attenuate the modulated signals to form a plurality of attenuated signals. The summing network combines the attenuated signals to form the radio frequency signal.

These and other features, aspects, and embodiments of the present invention will become better understood with regard to the following description, appended claims, and accompanying drawings.

BEST MODES FOR CARRYING OUT THE INVENTION

Figure 1:
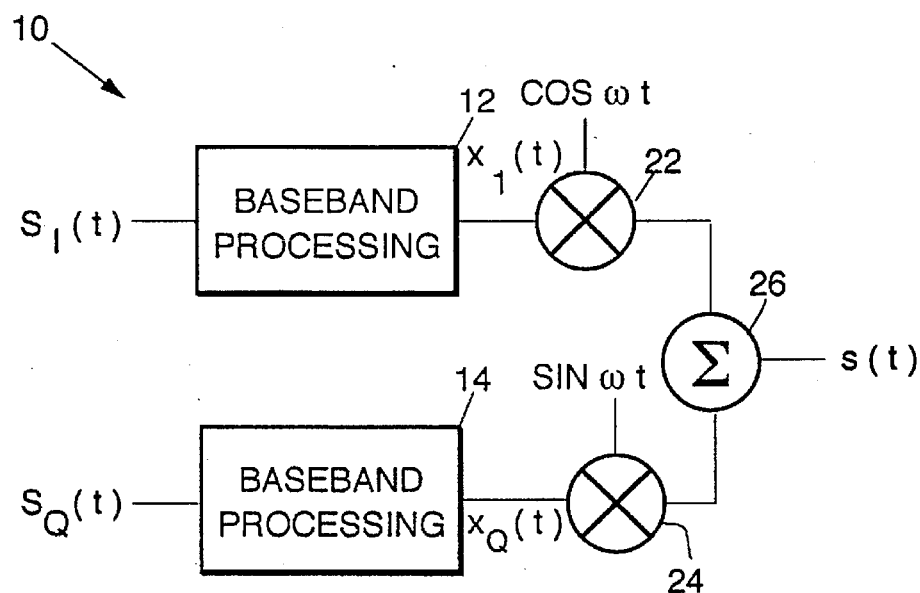
FIG. 1 is a block diagram of a conventional vector digital-to-RF modulator.
Figure 2:
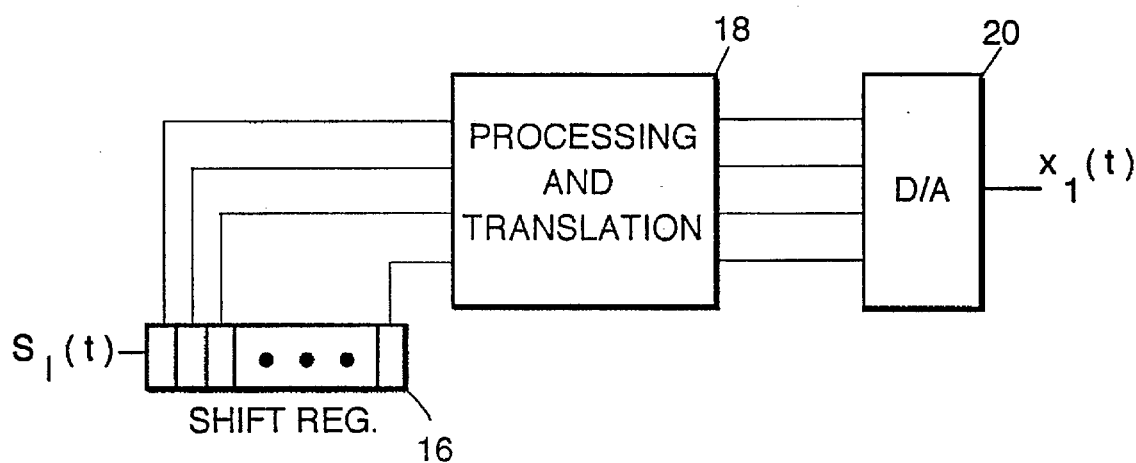
FIG. 2 is a block diagram of a baseband processor.

In order to motivate the architecture of a digital-to-RF modulator in accordance with the present invention, a signal analysis is performed with regard to the digital-to-RF modulator illustrated in FIG. 1. The baseband processors 12 and 14 produce output signals $x_I(t)$ and $x_Q(t)$, respectively, given by the following equations:

$$x_I(t) = \sum_{n=-\infty}^{\infty} \alpha_I(nT)[u_0(t-nT) - u_0(t-nT-T)] \quad (1)$$

$$x_Q(t) = \sum_{n=-\infty}^{\infty} \alpha_Q(nT)[u_0(t-nT) - u_0(t-nT-T)] \quad (2)$$

where $u_0(\bullet)$ is the unit step function, T is the symbol time, and $\alpha_I(\bullet)$ and $\alpha_Q(\bullet)$ are symbols for the inphase and quadrature components, respectively.

The inphase and quadrature symbols $\alpha_I(\bullet)$ and $\alpha_Q(\bullet)$ are each representative of data words having M bits of resolution. The symbols may be represented digitally as:

$$\alpha_I(nT) = \sum_{i=0}^{M-1} \alpha_{I,i}(nT) \, 2^i \quad (3)$$

and $$\alpha_Q(nT) = \sum_{i=0}^{M-1} \alpha_{Q,i}(nT) \, 2^i$$

where $\alpha_{I,i}(\bullet)$ and $\alpha_{Q,i}(\bullet)$ represent individual bits of the symbols, and may assume values of either zero or unity. Using this representation of the symbols, the signals $x_I(t)$ and $x_Q(t)$ are given by the following equations:

$$x_I(t) = \sum_{n=-\infty}^{\infty} \sum_{l=0}^{M-1} \alpha_{I,l}(nT) \, 2^l [u_0(t-nT) - u_0(t-nT-T)] \quad (4)$$

and $$x_Q(t) = \sum_{n=-\infty}^{\infty} \sum_{l=0}^{M-1} \alpha_{Q,l}(nT) \, 2^l [u_0(t-nT) - u_0(t-nT-T)] \quad (5)$$

In general, the output of the mixer 22 is given by the following equation:

$$s(t) = x_I(t)\cos\omega t + x_Q(t)\sin\omega t \quad (6)$$

Hence, the modulated signal s(t) produced at the output of the modulator 10 may be represented as follows.

$$\begin{aligned}
s(t) &= \sum_{n=-\infty}^{\infty} \left[ \cos\omega t \sum_{l=0}^{M-1} \alpha_{I,l}(nT) \, 2^l + \sin\omega t \sum_{l=0}^{M-1} \alpha_{Q,l}(nT) \, 2^l \right] \\
&\quad [u_0(t-nT) - u_0(t-nT-T)] \\
&= \sum_{n=-\infty}^{\infty} \left[ \sum_{l=0}^{M-1} [\alpha_{I,l}(nT)\cos\omega t] \, 2^l + \sum_{l=0}^{M-1} [\alpha_{Q,l}(nT)\sin\omega t] \, 2^l \right] \\
&\quad [u_0(t-nT) - u_0(t-nT-T)].
\end{aligned} \quad (7)$$

The outer summation over "n" in the preceding equation is a sum over the symbol time intervals. The two inner summations over "l" are a sum of BPSK (biphase shift keying) modulations of the bits of the signal. This arrangement of the summations suggests the architecture for a digital-to-RF converter as described hereinafter.

Figure 3:
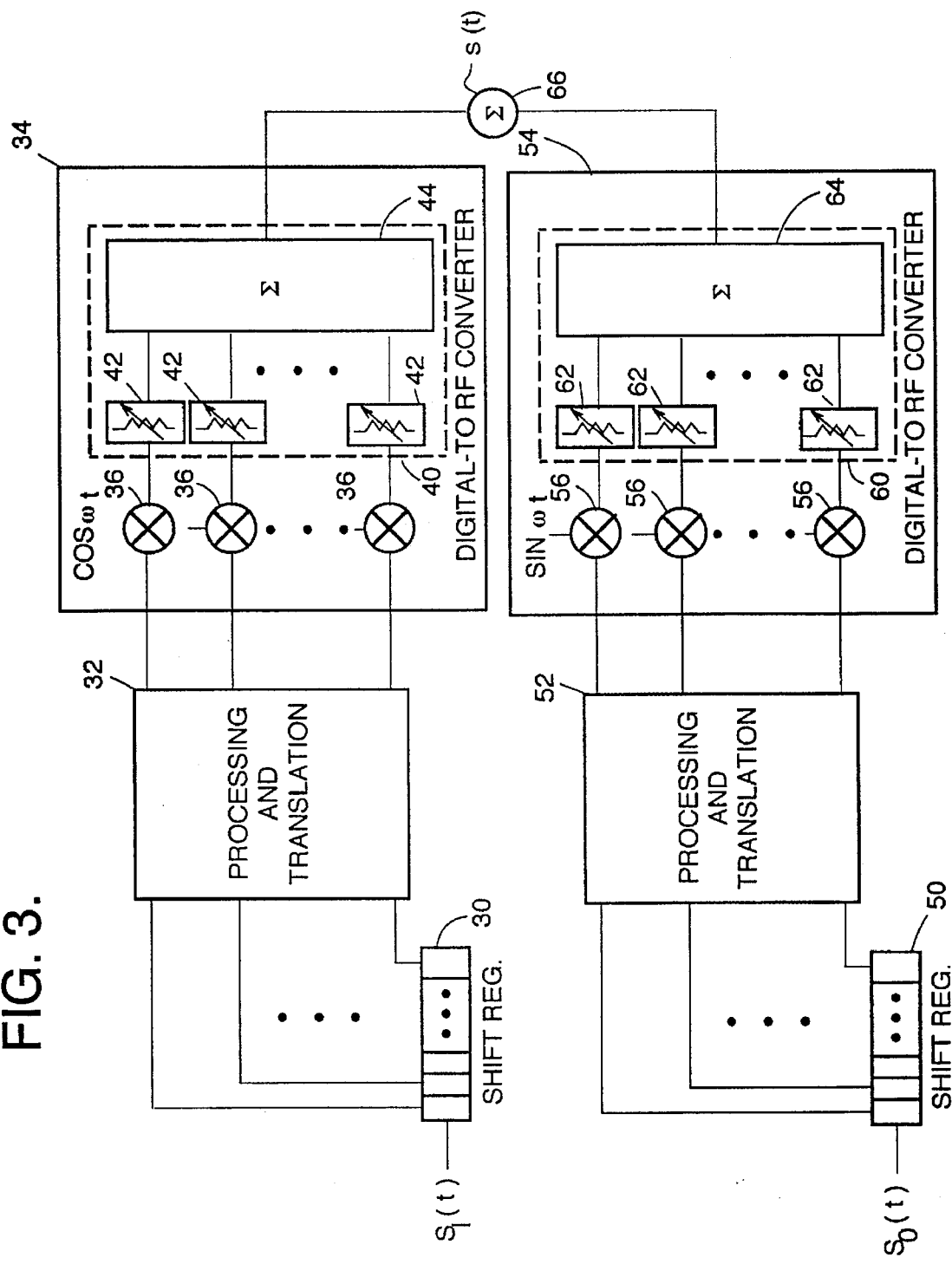
FIG. 3 is a block diagram of an embodiment of a vector digital-to-RF modulator in accordance with the present invention.

FIG. 3 is a schematic, block diagram of an embodiment of a vector digital-to-RF modulator in accordance with the present invention. A shift register 30 forms a time-dependent data word having a plurality of bits based upon an inphase signal $s_I(t)$. The time-dependent data word is applied to a processor 32 which performs baseband processing and/or symbol translation. The processor 32 produces a plurality of processed bit signals based upon the plurality of bits, and applies the processed signals to an embodiment of a digital-to-RF converter 34 in accordance with the present invention.

The digital-to-RF converter 34 includes a plurality of biphase modulators 36, each of which biphase modulates a sinusoidal radio signal, $\cos(\omega t)$, with one of the processed signals. As a result, the biphase modulators 36 produce a plurality of biphase modulated signals.

The digital-to-RF converter 34 further includes a summing network 40 in communication with the biphase modulators 36. The summing network 40 contains a plurality of attenuators 42, each of which attenuates a corresponding one of the biphase modulated signals. As a result, the attenuators 42 produce a plurality of attenuated signals. The attenuated signals are combined in summing block 44 to form a radio frequency signal.

Preferably, the attenuators 42 differ in attenuation by powers of two in order to produce a radio frequency signal in accordance with the first of the two inner summations over "l" given in equation (7).

A similar arrangement is utilized to form a quadrature path in the vector digital-to-RF modulator. A shift register 50 forms a time-dependent data word having a plurality of bits based upon a quadrature signal $S_Q(t)$. The time-dependent data word is applied to a processor 52 which produces a plurality of processed bit signals. The processed signals are applied to another embodiment of a digital-to-RF converter 54 in accordance with the present invention.

The digital-to-RF converter 54 includes a plurality of biphase modulators 56, each of which biphase modulates another sinusoidal radio signal, namely $\sin(\omega t)$, with one of the processed signals. The biphase modulators 56 produce a plurality of biphase modulated signals for application to a summing network 60. The summing network 60 contains a plurality of attenuators 62, each of which attenuates a corresponding one of the biphase modulated signals. Each may be attenuated by a different relative factor of two. The attenuators 62 produce a plurality of attenuated signals which are combined in summing block 64. As a result, a radio frequency signal is formed in accordance with the second of the two inner summations over "l" given in equation (7).

The radio frequency signals formed in the inphase and quadrature paths are combined in block 66 to form the modulated signal s(t).

In a preferred embodiment, the attenuators 42 within the summing network 40 are connected in a ladder network configuration. Similarly, it is preferred that the attenuators 62 be configured as a ladder network within the summing network 60. In one embodiment of the network, the attenuators 42 and 62 utilize FET (field effect transistor) attenuators.

Figure 4:
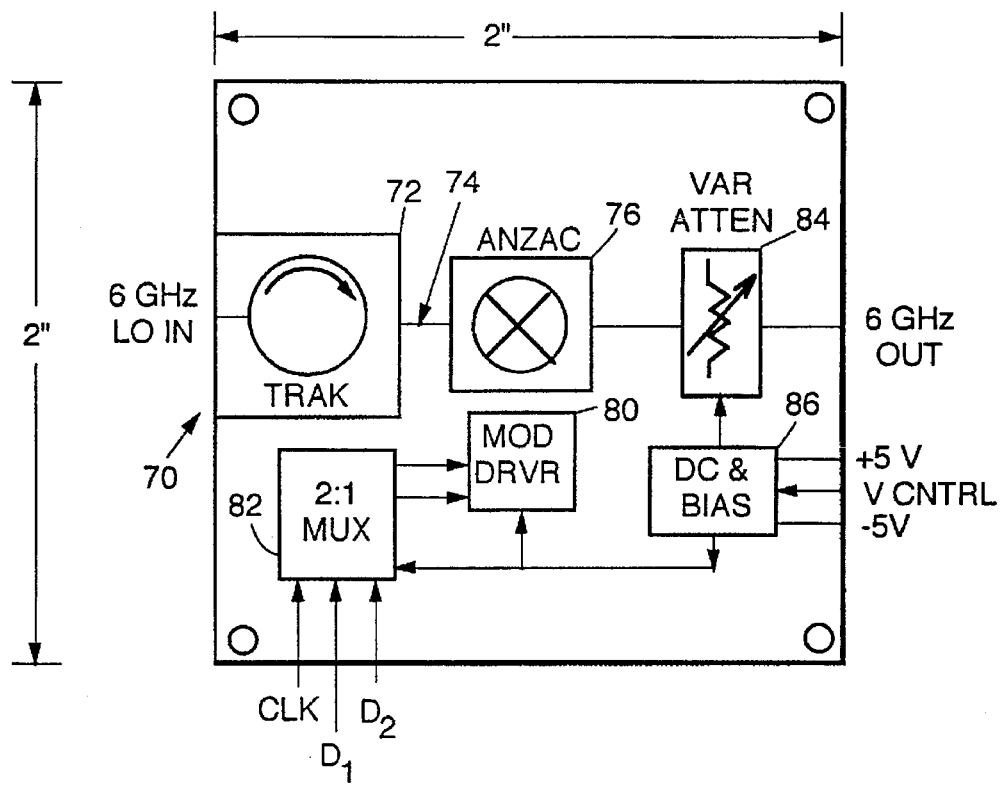
FIG. 4 is a schematic drawing of an embodiment of a biphase modulator and attenuator circuit for use in embodiments of the present invention.

Referring now to FIG. 4, there is shown a schematic, block diagram of an embodiment of a biphase modulator and attenuator circuit for use in the digital-to-RF converter. A sinusoidal radio frequency signal is received by a first port 70 of a circulator 72. A second port 74 of the circulator 72 is coupled to a first input of a mixer 76. A second input of the mixer 76 receives a baseband signal via a driver circuit 80 and a multiplexer 82. Both the multiplexer 82 and the driver circuit 80 are selected to have a sufficient rise time to fulfill the speed requirements of the converter.

The mixer 76 mixes the sinusoidal signal and the baseband signal to from a biphase modulated signal. The biphase modulated signal is applied to a variable attenuator 84 which attenuates the biphase modulated signal by a preselected attenuation in accordance with equation (7). The preselected attenuation is dictated by a control voltage received from a DC and bias circuit 86. In the illustrated embodiment, the DC and bias circuit 86 receives the control voltage from an external source (not specifically illustrated).

The DC and bias circuit 86 is further employed to receive supply voltages, such as +5 V and −5 V, from an external power supply (not specifically illustrated). The DC and bias circuit 86 uses the supply voltages to power the multiplexer 82 and the driver circuit 80.

The above-described biphase modulator and attenuator circuit produces an attenuated, biphase modulated signal at the output of the variable attenuator 84. The attenuated signal may then be combined with other attenuated, biphase modulated signals to form a converted RF signal. The above-described circuit may be physically embodied on a 2 inch by 2 inch surface for radio frequencies in the neighborhood of 6 GHz.

Figure 5A:
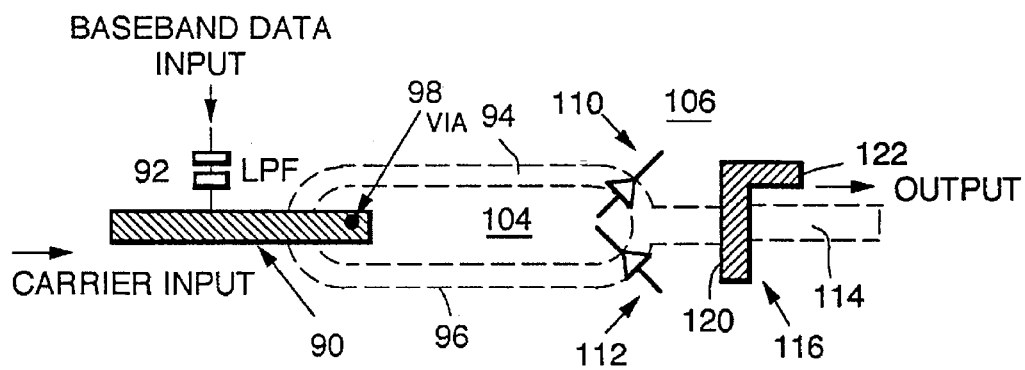
FIGS. 5A–5B show a top view and a side view of a microstrip embodiment of a biphase modulator for use in embodiments of the present invention.
Figure 5B:
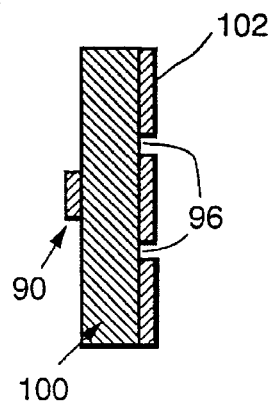

Referring to FIGS. 5A and 5B, there are shown a top view and a side view of a slotline design of an embodiment of a biphase modulator. A radio frequency carrier signal is applied to a first microstrip 90. A baseband data signal is filtered by a low-pass filter 92 before being applied to the first microstrip 90. The length of the first microstrip 90 terminates in proximity to a first end of an oval-shaped slot 94 of a slotline 96. The two sides of the oval-shaped slot 94 are each a quarter wave in length to produce phase shifts of ±90 degrees in the carrier signal.

As illustrated in FIG. 5B, the first microstrip 90 comprises a strip of conductive material located on a surface of a thin dielectric substrate 100. On an opposing surface of the substrate 100 are slots in a ground plane 102 which form the slotline 96.

Referring back to FIG. 5A, the oval-shaped slot 94 of the slotline 96 defines an interior portion 104 and an exterior portion 106 which is part of the ground plane 102. The baseband data signal is directly coupled to the interior portion 104 from the microstrip 90 by a via hole 98.

Two Schottky diodes 110 and 112 connect the interior portion 104 to the exterior portion 106. In particular, the Schottky diode 110 has its anode connected to the interior portion 104 and its cathode connected to the exterior portion 106, and the Schottky diode 112 has its anode connect to the exterior portion 106 and its anode connected to the interior portion 104. Hence, the applied baseband signal forward-biases one of the diodes and reverse-biases the other. The effect of this biasing is to connect only one side of the slotline 96 to the output at any instant of time. The slotline 96 has a rectangular slot 114 connected to a second end of the oval-shape slot 94.

A second microstrip 116 is located proximate to the rectangular slot 114 of the slotline 96. The second microstrip 116 includes a first rectangular portion 120 transverse to the rectangular slot 114 of the slotline 96. The second microstrip 116 further includes a second rectangular portion 122 connected to the first rectangular portion 120 to form an L-shape.

The above-described slotline embodiment of a biphase modulator produces a biphase modulated signal along the second rectangular portion 122 of the second microstrip 116. One embodiment of this slotline design has been realized for operation at K-band, and has been tested to 3.8 Gbps for use in flight hardware. The multiplexer was not employed at 1600 Mbps but is required at higher data rates.

Consider a situation where the signal s(t) is to be transmitted through a channel which may be described to first order by an impulse response function h(t) with corresponding transfer function:

$$H(\omega) = \int_{-\infty}^{\infty} h(t)e^{-j\omega t}dt.$$

According to the Nyquist Theorem, to avoid intersymbol interference, the signal should be filtered through a predistortion filter with impulse response g(t) corresponding to transfer function $H^{-1}(\omega)$. With this predistortion the transmitted signal becomes:

$$x(t) = \int_{-\infty}^{\infty} s(\tau)g(t-\tau)d\tau = \int_{-\infty}^{\infty} s(t-\tau)g(\tau)d\tau = \quad (8)$$

$$\int_{-\infty}^{\infty} x_I(t-\tau)\cos\omega(t-\tau)g(\tau)d\tau + \int_{-\infty}^{\infty} x_Q(t-\tau)\sin\omega(t-\tau)g(\tau)d\tau =$$

$$\left\{ \int_{-\infty}^{\infty} [x_I(t-\tau)\cos\omega\tau - x_Q(t-\tau)\sin\omega\tau]g(\tau)d\tau \right\} \cos\omega t +$$

$$\left\{ \int_{-\infty}^{\infty} [x_I(t-\tau)\sin\omega\tau + x_Q(t-\tau)\cos\omega\tau]g(\tau)d\tau \right\} \sin\omega t$$

The predistorted, transmitted signal x(t) can be expressed as:

$$x(t) = u_I(t)\cos\omega t + u_Q(t)\sin\omega t$$

where $$u_I(t) = \int_{-\infty}^{\infty} [x_I(t-\tau)\cos\omega\tau - x_Q(t-\tau)\sin\omega\tau]g(\tau)d\tau = \quad (9)$$

$$\sum_{n=-\infty}^{\infty} \left\{ \sum_{l=0}^{M-1} \left[ \alpha_{I,l}(nT) \int_{t-nT-T}^{t-nT} g(\tau)\cos\omega\tau d\tau \right] 2^l - \right.$$

$$\left. \sum_{l=0}^{M-1} \left[ \alpha_{Q,l}(nT) \int_{t-nT-T}^{t-nT} g(\tau)\sin\omega\tau d\tau \right] 2^l \right\}$$

and $$u_Q(t) = \int_{-\infty}^{\infty} [x_I(t-\tau)\sin\omega\tau + x_Q(t-\tau)\cos\omega\tau]g(\tau)d\tau = \quad (10)$$

$$\sum_{n=-\infty}^{\infty} \left\{ \sum_{l=0}^{M-1} \left[ \alpha_{I,l}(nT) \int_{t-nT-T}^{t-nT} g(\tau)\sin\omega\tau d\tau \right] 2^l + \right.$$

$$\left. \sum_{l=0}^{M-1} \left[ \alpha_{Q,l}(nT) \int_{t-nT-T}^{t-nT} g(\tau)\cos\omega\tau d\tau \right] 2^l \right\}.$$

This gives the transmitted signal $$x(t) = \sum_{n=-0}^{\infty} \left\{ \sum_{l=0}^{M-1} 2^l \left[ \alpha_{I,l}(nT) \int_{t-nT-T}^{t-nT} g(\tau)\cos\omega\tau d\tau - \right. \right. \quad (11)$$

$$\left. \alpha_{Q,l}(nT) \int_{t-nT-T}^{t-nT} g(\tau)\sin\omega\tau d\tau \right] \cos\omega t +$$

$$\sum_{l=0}^{M-1} 2^l \left[ \alpha_{I,l}(nT) \int_{t-nT-T}^{t-nT} g(\tau)\sin\omega\tau d\tau + \right.$$

$$\left. \left. \alpha_{Q,l}(nT) \int_{t-nT-T}^{t-nT} g(\tau)\cos\omega\tau d\tau \right] \sin\omega t \right\}.$$

which shows that the signal may be predistorted at baseband and modulated by the digital-to-RF conversion technique. This approach may be extended to more complex nonlinear channels.

The above-described embodiments of the present invention have many advantages. By following a bank of biphase modulators with a plurality of attenuators configured as a ladder network configuration in powers of two, an architecture is realized for performing a digital-to-analog conversion at the RF level. As a result, embodiments of the present invention overcome the speed limitation imposed by digital-to-analog conversion in prior digital-to-RF converters.

Since the converter consists primarily of a bank of identical biphase circuits, the architecture is easily amenable to a monolithic microwave integrated circuit (MMIC) implementation. Further, the disclosed architecture of a digital-to-RF vector modulator is versatile and permits extension of high-order modulation formats to high speed applications.

Embodiments of the present invention have application to any area requiring high frequency modulation of digital data. This includes any receiver, transmitter, and bandwidth efficient circuitry in both military and commercial applications.

While the best mode for implementing the invention has been described in detail, those familiar with the art to which this invention relates will recognize various alternative designs and embodiments for practicing the invention as defined by the following claims.

What is claimed is:

1. A system for predistorting a digital signal and converting the digital signal to a radio frequency signal, the digital signal representative of a time-dependent data word having a plurality of bits, the system comprising:

a plurality of biphase modulators, each of the biphase modulators modulating a sinusoidal radio frequency signal with a corresponding one of the bits to form a biphase modulated signal based upon the corresponding one of the bits, whereby the biphase modulators form a plurality of biphase modulated signals; and a summing network containing a plurality of variable attenuators having an attenuation dependent upon a transfer function of a communication channel, each of the attenuators responsive to a corresponding one of the biphase modulated signals, the attenuators attenuating the biphase modulated signals to form a plurality of attenuated signals, wherein the summing network combines the attenuated signals to form the radio frequency signal.

2. The system of claim 1 wherein the attenuators are connected in a ladder network configuration.

3. The system of claim 1 wherein each of the attenuators includes a corresponding field-effect transistor attenuator.

4. The system of claim 1 wherein the attenuators differ in attenuation by powers of two.

5. A system for converting a digital signal to a radio frequency signal, the digital signal having an inphase component and a quadrature component, the system comprising:

a first shift register for generating a first time-dependent data word having a plurality of bits based upon the inphase component of the digital signal;

a second shift register for generating a second time-dependent data word having a plurality of bits based upon the quadrature component of the digital signal;

a first set of biphase modulators responsive to the first shift register, each of the biphase modulators of the first set modulating a first sinusoidal radio frequency signal with a corresponding one of the bits of the first time-dependent data word to form an inphase biphase modulated signal based upon the corresponding one of the bits of the first time-dependent data word, whereby the biphase modulators form a plurality of inphase biphase modulated signals;

a second set of biphase modulators responsive to the second shift register, each of the biphase modulators of the second set modulating a second sinusoidal radio frequency signal with a corresponding one of the bits of the second time-dependent word to form a quadrature biphase modulated signal based upon the corresponding one of the bits of the second time-dependent data word, whereby the biphase modulators form a plurality of quadrature biphase modulated signals;

a first summing network containing a plurality of variable attenuators, each of the attenuators in the first summing network responsive to a corresponding one of the inphase biphase modulated signals, the attenuators attenuating the inphase biphase modulated signals to form a plurality of inphase attenuated signals:

a second summing network containing a plurality of variable attenuators each of the attenuators in the second summing network responsive to a corresponding one of the quadrature biphase modulated signals, the attenuators attenuating the quadrature biphase modulated signals to form a plurality of quadrature attenuated signals; and a summer circuit combining the inphase and quadrature attenuated signals to form the radio frequency signal.

6. A method of predistorting a digital signal and converting the digital signal to a radio frequency signal, the digital signal representative of a time-dependent data word having a plurality of bits, the method comprising the steps of:

forming a plurality of biphase modulated signals with a corresponding plurality of biphase modulators, wherein each of the biphase modulated signals is based upon a corresponding one of the bits and includes a sinusoidal radio frequency signal modulated with the corresponding one of the bits;

attenuating each of the biphase modulated signals with an attenuation dependent upon a transfer function of a communication channel to form a plurality of attenuated signals; and combining the attenuated signals to form the radio frequency signal.

7. The method of claim 6 wherein the biphase modulated signals are relatively attenuated by powers of two.

8. The method of claim 6 further comprising the step of predistorting the digital signal at baseband in dependence upon a transfer function of a communication channel.

* * * * *